(12) United States Patent
Weinstein

(10) Patent No.: US 7,051,356 B2
(45) Date of Patent: May 23, 2006

(54) METHOD AND SYSTEM FOR REMOTE WIRELESS VIDEO SURVEILLANCE

(75) Inventor: Richard D. Weinstein, Chesterfield, MO (US)

(73) Assignee: Sentrus, Inc., Chesterfield, MO (US)

( * ) Notice: Subject to any disclaimer, the term of this patent is extended or adjusted under 35 U.S.C. 154(b) by 570 days.

(21) Appl. No.: 10/082,682

(22) Filed: Feb. 25, 2002

(65) Prior Publication Data

US 2003/0163826 A1     Aug. 28, 2003

(51) Int. Cl.
*H04N 7/173* (2006.01)

(52) U.S. Cl. .............. 725/105; 348/143; 348/151

(58) Field of Classification Search ........... 725/105, 725/73; 348/143, 151, 211.3, 207.1, 158; 370/443, 316
See application file for complete search history.

(56) References Cited

U.S. PATENT DOCUMENTS

| | | | |
|---|---|---|---|
| 5,111,290 A | | 5/1992 | Gutierrez |
| 5,128,755 A | | 7/1992 | Fancher |
| 5,406,324 A | | 4/1995 | Roth |
| 5,712,679 A | | 1/1998 | Coles |
| 5,742,336 A | * | 4/1998 | Lee .............. 348/144 |
| 5,793,419 A | | 8/1998 | Fraley |
| 5,886,738 A | | 3/1999 | Hollenbeck et al. |
| 6,181,373 B1 | | 1/2001 | Coles |
| 6,271,805 B1 | * | 8/2001 | Yonezawa .............. 345/1.1 |
| 6,292,213 B1 | | 9/2001 | Jones |
| 6,317,039 B1 | | 11/2001 | Thomason |
| 6,392,692 B1 | * | 5/2002 | Monroe ............... 348/143 |
| 6,462,775 B1 | * | 10/2002 | Loyd et al. ........... 348/151 |
| 6,493,466 B1 | * | 12/2002 | Honda et al. .......... 382/236 |
| 6,609,010 B1 | * | 8/2003 | Dolle et al. .......... 455/552.1 |
| 6,675,386 B1 | * | 1/2004 | Hendricks et al. ....... 725/105 |
| 6,698,021 B1 | * | 2/2004 | Amini et al. .......... 725/105 |
| 6,750,902 B1 | * | 6/2004 | Steinberg et al. ...... 348/211.3 |
| 6,751,221 B1 | * | 6/2004 | Saito et al. .......... 370/392 |
| 6,778,550 B1 | * | 8/2004 | Blahut ............... 370/443 |
| 2002/0057365 A1 | * | 5/2002 | Brown ............... 348/552 |
| 2002/0063799 A1 | * | 5/2002 | Ortiz et al. .......... 348/559 |
| 2003/0035386 A1 | * | 2/2003 | Sullivan ............. 370/316 |
| 2003/0133015 A1 | * | 7/2003 | Jackel et al. ......... 348/207.1 |

FOREIGN PATENT DOCUMENTS

| | | |
|---|---|---|
| WO | WO9912349 | 3/1999 |
| WO | WO0126280 | 4/2001 |

OTHER PUBLICATIONS

United States Frequency Allocation Chart.*
Pages from Internet website of XCAM2, Tiny Wireless Video Camera Kit; http://www.x10.com (5 pages).
"Concept Of A Wireless Indoor Video Communication System", F. Fazel et al., 193-208.

* cited by examiner

*Primary Examiner*—Gims Philippe
*Assistant Examiner*—Erick Rekstad
(74) *Attorney, Agent, or Firm*—Polster, Lieder, Woodruff & Lucchesi, L.C.

(57) ABSTRACT

Disclosed are a system and method for providing wireless video surveillance of a remote location using microwave transmission of video data using TCP/IP networking protocol. The system comprises a remote unit having one or more analog cameras, a video encoder/decoder linked to a microwave transceiver using Ethernet transceivers connected by a twisted wire pair. The microwave transmission is received by a base unit comprising another microwave transceiver and Ethernet transceiver linked to a computer. The base unit computer is connected to one or more computer networks to enable transmission of the video data to multiple computer terminals on the network.

17 Claims, 3 Drawing Sheets

METHOD AND SYSTEM FOR REMOTE WIRELESS VIDEO SURVEILLANCE

BACKGROUND OF THE INVENTION

Surveillance applications, such as those incorporating full motion video, require transfer of large amounts of data. Efforts to reduce the performance requirements upon the data transmission system when large amounts of data must be transferred over the system have resulted in various data compression schemes. For example, video or graphical data may be compressed to occupy less space. Compressed data may then be transmitted and, because the data has been compressed into fewer information bits, fewer bits need to be transmitted, thereby relieving to some extent the loading upon the data transmission system. However, there are limits on the extent to which data may be compressed. In the past, compression imposed computational overhead upon the system and sometimes took too much time to complete. Compressed data must be decompressed at the destination at the other end of the transmission system in order to be useable, which imposes additional computational overhead upon the system. Although compression and decompression may be performed in software, the speeds at which such operations can be performed limit the usefulness of such techniques in some applications such as realtime full motion 30 frame per second video. If dedicated hardware is utilized, the additional hardware required to perform compression and decompression has limited the use in some applications where small size and miniaturization are required, and in other instances the cost of such additional hardware may be impractical.

Transmission of a real time video signal from a remote location to a base location is conventionally done by one of two methods: microwave or satellite. Equipment associated with these methods is extremely expensive and has significant limitations. The large amount of equipment necessary for satellite technology for remote transmission requires that the equipment be installed in trucks having an integral satellite dish. The signal is received from the video camera, beamed to the satellite, and then beamed to the base location for broadcast. Although the costs associated with satellite transmission are justifiable for large events such as sporting events where transmission could be made from a single location over a sustained period of time, the enormous amount of equipment and the sophisticated technology required makes satellite transmission extremely expensive and impractical for most surveillance applications.

Microwave transmission technology overcomes some of the limitations of satellite technology but has several additional limitations of its own. Microwave transmission systems are less expensive and require less equipment. With a conventional microwave system, a video signal is obtained and transmitted from the remote location at microwave frequencies from a vehicle mounted transmitting antenna to a base antenna for broadcast.

Difficulties have been encountered using this technology in aligning the antenna on the vehicle with the base antenna. Obstructions between the transmitting antenna and the base antenna may also prevent passage of the signal. Setup limitations also inhibit the use of microwave transmission systems in obtaining short segments of video at one location, transmission of that signal, moving to another location, transmission, movement, etc. Transmission is also limited to accessibility of the vehicle to the location of the subject matter.

Although advancements in cellular technology have allowed cellular telephones to transmit voice messages and data such as facsimile and computer file transmissions from one location to another, this technology has never been used to transmit a high quality video signal.

The prior art in wireless LAN systems includes a variety of IR, or infrared, and RF, or radio frequency systems. Prior-art IR systems lack the bandwidth, optics or protocol to implement transmission of full motion 30 frame per second video. Prior art RF systems are either limited by spectrum availability to a data rate less than 10 Mbit/s, or designed for stationary mounting and ac-powered operation.

A need, therefore, exists in the art for a highly portable, cost-effective method and apparatus for capturing and transmission of real time quality video from a remote location to a base location. A need also exists for a capability for further retransmission of the video signal from the remote location through the base location apparatus over computer network, land lines, or other network to multiple users in diverse geographic locations.

SUMMARY OF THE INVENTION

It is the purpose of the present invention to provide a method and means for capturing full-color, full-motion audio/video signals, digitizing and compressing the signals into a digitized data file in Internet protocol (IP) format, and transmitting the signals over microwave frequencies using a small, easily concealable, remotely controlled remote unit.

The remote unit includes means for generating, digitizing and compressing a video signal, storage of the digitized and compressed data file, and transmission of this data file over microwave frequency. The remote unit may also store the data file to a memory device, such as a hard disk drive, prior to transmission for later retrieval and review on a playback unit.

In one preferred embodiment, an audio/visual signal is input into the remote unit from a video camera at a remote location.

The base unit is a combination microwave transceiver and portable personal computer having one or more computer network interfaces. Computer software loaded on a hard disk drive in the base unit instructs it to capture the input signal to a video player software within the base unit for review on a video display at the base unit.

A software sequence installed on a field programmable gate array (FPGA) in the remote unit may automatically catalog data for storage on the system hard drive, or may accept user instructions input from the computer terminal at the base unit.

DETAILED DESCRIPTION OF THE PREFERRED EMBODIMENT

As described more fully below, the invention takes advantage of the capability of microwave transmission to enable remote acquisition of full motion 30 frame per second (FPS) video.

Figure 1:
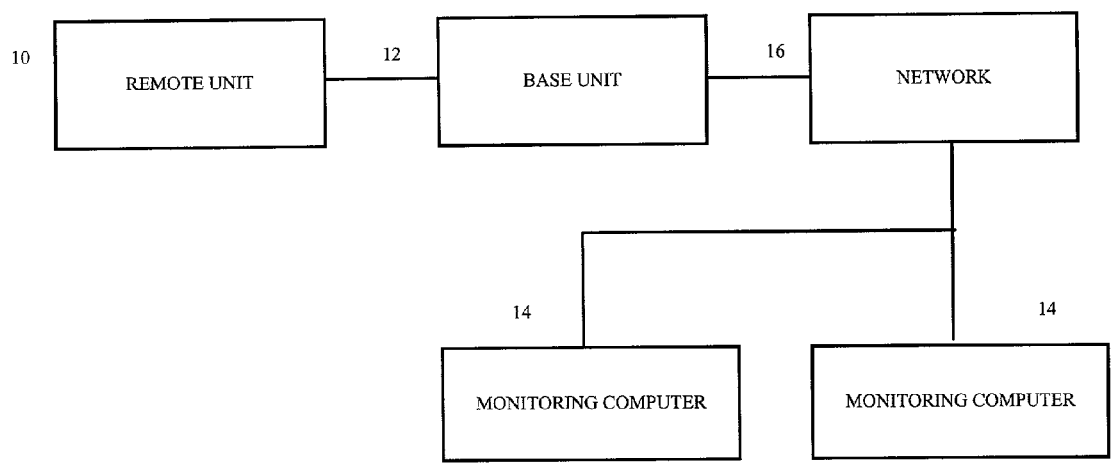
FIG. 1 is a block diagram of a system for wireless transmission of video data in accordance with an embodiment of the invention.

As shown in FIG. 1, the system of the present invention comprises a remote unit 10 for capture and wireless transmission of video data, a base unit 12 located up to several miles away to receive the video data, and a plurality of monitoring stations 14 in connected by one or more computer networks 16 to base unit 12 for global viewing and/or downloading of the video data.

Remote Transmission Unit

Figure 2:
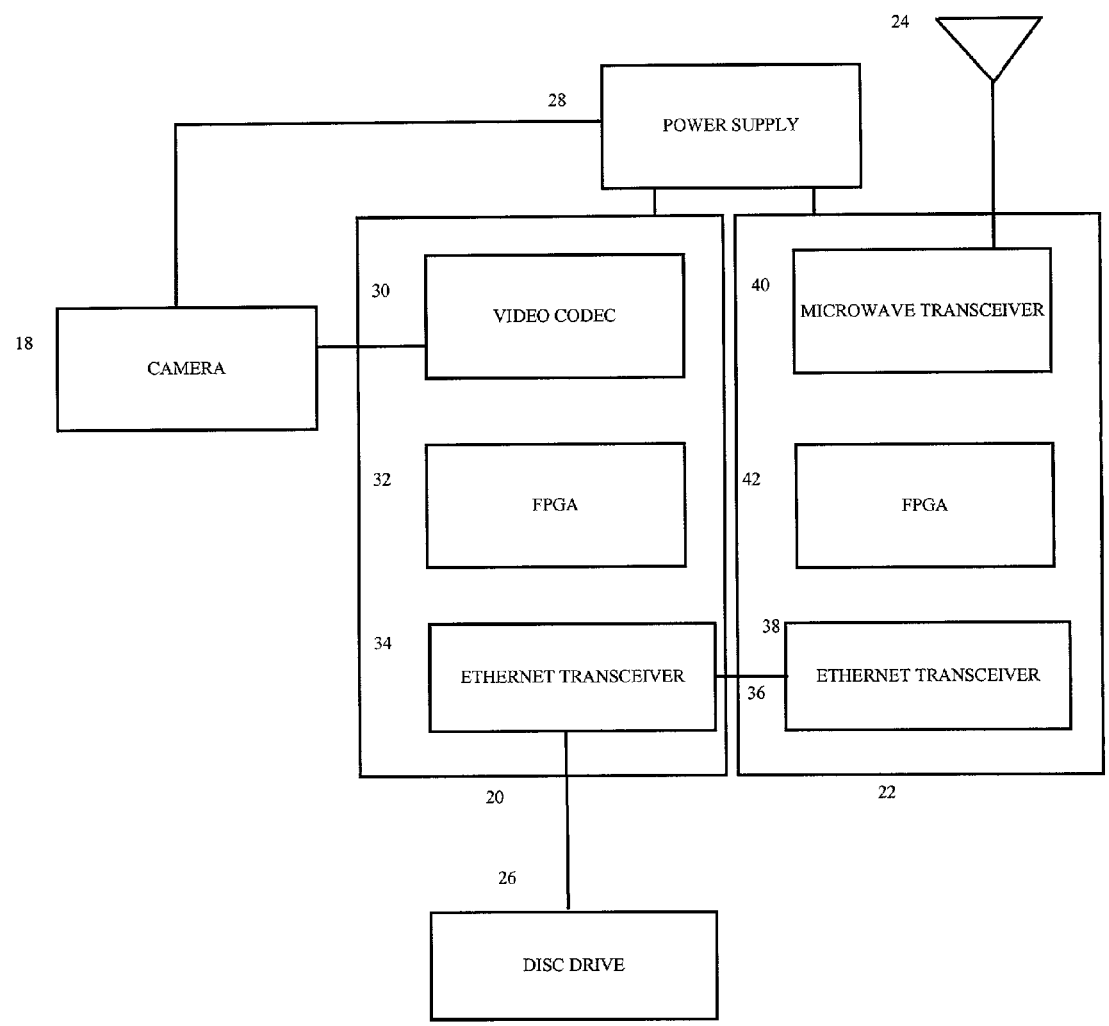
FIG. 2 is a block diagram of the remote unit of the system of FIG. 1.

As shown in FIG. 2, the remote unit 10 comprises at least one analog video camera 18, a video board 20 for receiving and processing the analog data from the cameras 18, a microwave transceiver unit 22 for transmitting the data to the base unit 12, an antenna 24 for the microwave transceiver 22, a hard disc drive unit 26, and a battery power supply 28 for operating the cameras, video board, microwave transceiver, and hard drive of the remote unit.

Video Camera

Among the several objects of the present invention may be noted the provision of a video image transmission system for continuously and reliably monitoring one or a number of locations. If more than one location is being monitored, the system enables all of the locations to be simultaneously monitored from the base station, even though the locations are remote from each other and the central station. For this purpose, the system incorporates a board-level miniature video camera 18, such as a CCD (charge coupled device) camera, a CMOS (metal oxide semiconductor) camera or other observation or inspection device which is well known in the art.

In a preferred form of the invention, the camera is a "board-level" camera which is particularly small in size. The small size of the camera is beneficial to the utility and the function of the imaging module according to the present invention.

Preferably, the lens is an off-the-shelf 25 mm "lipstick" lens. It is to be appreciated, however, that the use of 50 mm achromatic field lens also allow a desired field of view (4.5 mm.times.6.00 mm) to be achieved. Preferably, the camera is mounted on the video board.

If remote operation of the camera is desired, the system of the present invention allows a user at the base unit, or other computer terminal in network communication with the base unit, to transmit control inputs adjusting the pan, tilt, zoom and focus settings (PTZ) for the remote video camera. Sony Electronics offers a line of cameras that have established an industry standard remote PTZ software compatible with the standard PTZ drivers. One such camera which may be used in the present invention is the Sony model EVID30C, which offers the following capabilities:

Video Signal: NTSC
Image Sensor: ⅓" IT Color CCD
Effective Pixels: 768 (H)×492 (V)
H. Resolution: 460 TV lines
V. Resolution: 350 TV lines
Lens: ×12 Power Zoom,~f=5.4 to 64.8 mm, F1.8 to F2.7
H. Angle of View: 4.4° (tele end) to 48.8° (wide end)
V Angle of View: 3.2° (tele end) to 37.6° (wide end)
Shortest Subject Distance: 10 mm (WIDE end), 800 mm (TELE end)
Min. Illumination: 7 lux (F1.8)
Illumination Range: 7 to 100,000 lux
Auto Exposure: Auto Iris, AGC
Shutter Speed: ⅟60 to ⅟10,000 (VISCA™ control)
Gain: Auto/Manual (VISCA™ control)
White Balance: TTL Auto Tracing/One Push Hold, Indoor Preset, Outdoor Preset (VISCA control)
S/N Ratio: more than 48 dB
Pan/Tilt: Horizontal±100° (Max speed 80°/sec), Vertical±25° (Max speed 50°/sec)
Video Output: RCA pin jack, 1Vp-p, 75 ohm unbalanced
S Video Output: 4 pin mini DIN
Audio Output: RCA pin jack (monaural), Rated output 327 mV, Output impedance less than 2.2. kilohms
Control Terminal: RS232C, 8 pin mini DIN, 9600 bps, Data 8 bit, Stop 1 bit
Microphone Input Terminal: Mini jack (monaural) (diameter 3.5), Rated input 0.775 mV DC3V for low impedance microphone, Input Impedance more than 10 k ohms
Power Terminal: DC IN 13.5V (EIAJ unified polarity type)
Power Requirements: DC12 to 14V
Power Consumption: 11W
Operating Temperature: 0 to 40° C.
Storage Temperature: −20 to 60° C.
Dimensions(W/H/D): Camera 142×109×164 mm
Weight: Camera 1200 g.

Video Board

One or more video cameras 18 are preferably located on or in close proximity to the video board 20 of the remote unit 10. The video board 20 has provisions for inputs for three cameras for video, audio input capability and RS232 outputs for PTZ control capability for each camera. The three video inputs may be in NTSC or PAL format. The video board also has output provisions and the capability for an IDE hard drive to locally store the video data for subsequent retrieval and review.

The video board also comprises a video codec (encoder/decoder) chip 30 which takes the audio/visual signal, digitizes it into a computer data file and compresses that data file, an FPGA 32 to provide remote web-based control of the operation of the video board components, and an Ethernet transceiver 34 to convert the video data to IP format and to receive incoming web-based control instructions for the FPGA 32. The Ethernet transceiver 34 of the video board is connected to an RJ-45 connector which is connected by a category 5e twisted pair cable 36 to another RJ-45 connector on the microwave transceiver unit 22.

Video Codec

The video codec chip 30 comprises a video encoder and decoder chip that has an algorithm that converts input analog video to IP based protocol.

Suitable codecs for the present invention include Sigma Designs EM8470 Series MPEG-4 decoder which provides decoding of MPEG-1, MPEG-2 and MPEG-4. MPEG refers to the Motion Picture Experts Group which has developed draft standards for audiovisual compression/decompression routines. Also suitable is the stream Machine CS92288 (SM2288) MPEG-2 Video Encoder/Decoder, which is a single chip MPEG-2 Main Level@Main Profile audio and video codec.

Ethernet Transceiver

Since 1990, the wired local area network defined by IEEE (The Institute of Electrical and Electronic Engineers, Inc.) standard 802.3i-1990 has rapidly emerged as the preeminent wired network standard. This network is commonly referred to as 10BASE-T Ethernet, where 10BASE-T is an acronym which stands for 10 Mb/s, baseband transmission, and twisted-pair wiring. As in the present invention, two 10BASE-T applications can form a "network" using cross-connected transceivers connected by twisted-pair wiring.

The Ethernet transceiver 34, known in the art, includes a 10BASE-T Medium Dependent Interface for communicating with a wireless transceiver 22 using a twisted-pair cable 36 connected to the standard interface connector.

Microwave Transceiver Unit

The microwave transceiver unit 22 comprises an Ethernet transceiver 38 similar to that used in the video board, a microwave transceiver 40 and an internal arrayed microwave antenna 24. The Ethernet transceiver 22 and microwave transceiver 40 can be found in an internal arrayed combination in one of several commercially available wireless bridges which operate in the FCC authorized U-NII bands, for example, simultaneously using a channel at 5.3 GHz in one direction, and at 5.8 GHz in the other direction to deliver full duplex communications. These wireless intensity-modulated binary-coded data transceivers, which employ IEEE standard 10BASE-T Ethernet, provide the system of the present invention with high capacity transmission, including IP for 10/100 Ethernet, [and full or half duplex LAN support] operating over distances up to 4 miles with integral flat panel antennas, or 7 miles with a parabolic antenna.

The wireless microwave transceiver 40 and the Ethernet transceiver 38 are controlled through IP inputs using an FPGA communication controller 42.

The Ethernet transceiver 38, known in the art, includes a 10BASE-T Medium Dependent Interface for communicating with a wireless transceiver using a twisted-pair cable 36 connected to the standard interface connector. The wireless transceiver 40 utilizes a data rate of 10 megabytes and modulation type of "DFSK" or "4FSK." As known in the art, FSK stands for, frequency shift keying. In the United States, for example, the Post Office Standard Advisory Group has adopted (for pagers) the modulation process of frequency shift keying (FSK). Commercially available products suitable for use in the present invention include the Stratum 100 wirefree radio system manufactured by Proxim Inc., offering 100 Mbps full-duplex, and the Lynx® OC-3 wireless bridge made by Western Multiplex Corporation which operates in the license-exempt 5.3/5.8 GHz U-NII band and offers full duplex capacity of 155 Mbps and transmission distances of up to 7 miles/11 kilometers.

Battery Power Supply

The battery power supply 28 preferably comprises a 6 volt gel cell type battery, which may operate the cameras, video board, microwave transceiver and disk drive for up to 8 hours. The power supply may be augmented with a solar cell array for uses in environments with sufficient ambient light to provide prolonged battery life.

Web-Based Controllers

Both the microwave transceiver unit 22 and the video board 20 are IP addressable through field programmable gate arrays 32 and 42 (FPGA). Both FPGAs includes a plurality of configurable logic blocks (CLBs), each having a configurable logic element (CLE) and an associated function block.

FPGAs permit relatively short design cycles, reduce costs through logic consolidation, and offer flexibility in their re-programmability. The capabilities of and specifications for FPGAs are well known in the art.

Some types of FPGAs are implemented with a network of programmable logic and include lookup tables (LUTs). A LUT is used to implement a user-programmed logic of the LUT inputs, and the number of inputs for a particular LUT depends upon the architecture.

For example, sum and carry signals for each column can be generated in response to the three input signals associated with the column. The generation of sum and carry signals in to three generic input signals A, B and C is summarized below in Table 1.

TABLE 1

| A | B | C | SUM | CARRY |
|---|---|---|-----|-------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

In the preferred embodiment of the present invention, the programming includes standard placement of any "web applications browser" software that interacts with the hardware/firmware on the board. The FPGAs are coded using C code that is either hand produced or produced from a development/design application. As is known in the art, the programming code comprises algorithms which are transforms, such as FFTs, FIRs, IIRs, Reed-Solomon, etc., that convert the analog signal (the waveform in this case) into a binary format at the base unit signal collection point.

Base Unit Signal Collection Point.

Figure 3:
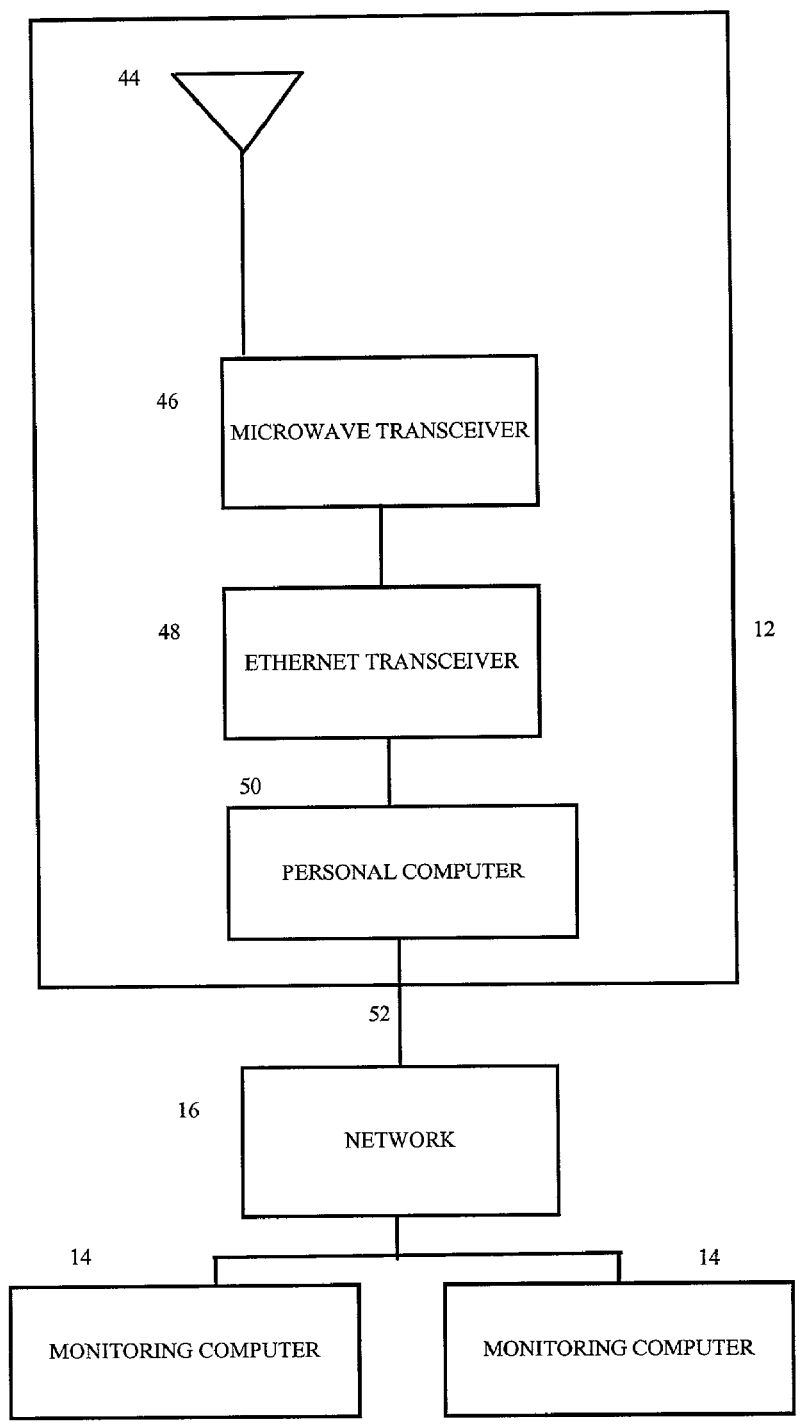
FIG. 3 is block diagram of the base unit of the system of FIG. 1.

As shown in FIG. 3, the base unit 12 serves as the data collection point and comprises a microwave antenna 44, a microwave transceiver 46 and Ethernet transceiver 48 similar to that of the microwave transceiver unit 22 of the remote unit 10, and a desktop personal computer 50.

The base unit desktop personal computer 50 has installed communications software and one or more computer interfaces for data transmitted via the public Internet or virtual private networks that are IP based. The interfaces are set to receive transmitted data files from the remote unit.

The base unit desktop personal computer 50 serves as the playback unit which is the interface between captured video and the master control which outputs the signal. Once the recombined data file has been stored on the networked hard disk drive of the playback unit, the data file may then either remain stored for later use or retrieved and transmitted via the public Internet or virtual private networks.

Stored data files may also be edited at the base unit location as desired.

In the preferred embodiment, the base unit incorporates a portable personal computer 50 having a 486DX-2/66 motherboard, 10-inch plasma display, 210 MB notebook hard disk drive, MS DOS Ver. 6.2 operating system, Microsoft-.RTM. Windows.TM. Ver. 3.1, Microsoft.RTM. Video for Windows, Procom Plus.RTM. for Windows, trackball bus mouse, high speed serial ports. The remote unit also has capability for up to four network interfaces.

Also, base unit 12 may incorporate video and/or audio signal compression and decompression circuitry and algorithms, not shown for use in transmitting audio and video over network link 16. One known compression standard is the Motion Pictures Electronics Group (MPEG); other standard compression algorithms may be suitably used to advantage as well. Base unit 12 may include decompression circuitry and algorithms (not shown) which are used upon receipt of a compressed video/audio signal to generate an uncompressed signal for display.

Communication link 52, which connects base unit 12 with networks 16, may be any conventional linking facility having the capability for transmission of full motion video as known in the art, such as a twisted pair, fiber optic facility, or satellite link, to network 16.

Remote Control of Camera Operation

The present system is designed to provide the capability to track a subject and to remotely control all camera operation variables through the system such as zoom, focus, iris, subject position within the field of view, shutter speed, even when the distance between the remote unit and the monitoring station exceeds several miles. The present invention provides remote operation of the PTZ camera, including adjusting the pan, tilt, zoom and focus setting for the remote video camera 18 from a user terminal at the base unit 12 or monitoring location 14. The terminal may be equipped with a computer mouse, keyboard, the data processor and memory as is well known in the art (not shown). The user may use computer input devices such as the computer mouse to input selections to the processor including selections of a plurality of video transmitter devices that may be at different locations. The user may click on various choices of location and type, other choices of pop-up windows and click in a known manner to control pan, tilt, rotate and zoom within the field of view of each remote transmission device. A processor/server at the terminal monitors and scans the mouse or other user inputs for controlling the video cameras.

The user commend is sent from a digital interface on the PC in Sony format out over the microwave data stream to the remote unit, where it comes out in RS232 format. The Sony camera drivers in the camera controller operate the servo motors for pan left, right, tilt up, down, and iris control.

From the foregoing it can be seen that the camera lens control apparatus may also be partially or completely under the control of the microprocessor-driven base unit. Algorithms may be provided for the complete control of zoom, focus and iris and other camera image variables to provide for the desired position change and the rate of position change of the lens system. For example, the speed of convergence of the zoom, focus and iris functions from one position to another can be controlled to work together for the smoothest performance needed in a particular application.

While preferred embodiments of the invention and preferred methods of practicing the same have been shown and described herein, persons of ordinary skill in the art will recognize and appreciate that the invention encompasses and includes numerous modifications and variations thereto without departing from the spirit and scope of the present invention. In addition, it should be understood, and persons of ordinary skill in the art will recognize, that aspects of the various preferred embodiments discussed herein may be interchanged or eliminated both in whole or in part. Furthermore, those of ordinary skill in the art will appreciate the foregoing description is by way of example only, and does not and is not intended to limit the scope, nature and/or variations of the invention.

What is claimed is:

1. A method of providing covert remote wireless video surveillance of a remote location comprising the steps of:
   using a fixed covert imaging means to generate analog electrical signals representative of real time images of the remote location;
   using a signal compression chip for converting the analog signals to digital electrical signals and packetizing the digital electrical signals into a secure pre-selected IP protocol format;
   transmitting the packetized digital electrical signals using a first transceiver;
   receiving the packetized digital electrical signals using a second transceiver;
   converting the packetized digital electrical signals into a microwave signal and transmitting the microwave signal to a base unit;
   receiving the microwave signal at the base unit;
   sending the secure, received signal over a computer network to a plurality of user terminals;
   converting the secure, received signal to digital video signals using a video player; and
   displaying the digital video signals on the plurality of user terminals for simultaneous viewing by more than one user.

2. The method of claim 1 wherein the secure pre-selected IP protocol format comprises a private intranet network.

3. The method of claim 1 wherein the microwave transmission has a frequency between 5.0 and 6.0 Ghz.

4. The method of claim 1 further comprising the step of inputting pan, tilt, and zoom control instructions at the base unit to control the operation of the fixed covert imaging means.

5. The method of claim 1 further comprising the step of using additional cameras at the remote location and selecting between video data generated by the fixed covert imaging means.

6. The method of claim 5 wherein the selecting between video data is made by inputs to the base unit.

7. The method of claim 1 wherein the computer network is the internet.

8. A system for providing convert, direct wireless video surveillance data obtained at a remote location to a plurality of computer terminals on a network comprising:
   at least one fixed covert camera for generating an electromagnetic signal containing video data representing real time images of the remote location;
   a signal compression chip for converting the electromagnetic signal into a digital signal;
   means for encrypting the digital signal into a secure pre-selected IP protocol format;
   a first transceiver for transmitting the encrypted digital signal;
   a second transceiver for receiving the encrypted digital signal;
   means for transmitting via microwave transmissions the encrypted digital signal to a base unit;
   means for receiving and decoding the microwave transmission at the base unit; and
   means for transmitting the microwave transmission from the base unit to a plurality of computer terminals over a private network for more than one user to simultaneously view the real time image using the plurality of computer terminals.

9. The system of claim 8 further comprising means for storing the microwave transmission at the base unit.

10. The system of claim 8 further comprising means for controlling the fixed covert camera from inputs at the base unit.

11. A covert wireless data communication system for the acquisition and secure transmission of data, comprising:
    at least one fixed remote transceiver, said transceiver being a self contained, powered device selectively activatable to acquire and transmit, in real time, covert data relating to a geographic location at which the transceiver is placed, said transceiver comprising an imaging means, data encoding means, and a transmitter such that as the imaging means acquires data, the data encoding means converts the data, using a signal compression chip, to a secure digital file which the transmitter transmits at a pre-selected microwave frequency over a secure transmission path;

a central transceiver in direct communication with said remote transceiver and receiving the transmitted secure digital file, the central transceiver including a server to which the central transceiver provides the secure digital file when it is received, the server being configured to construct a digital video signal from the data contents of the digital file; and display means to which the resulting digital video signal is supplied for displaying a video image of the geographic location to a plurality of terminals so the real time video image can be simultaneously viewed by more than one user.

12. The covert wireless data processing system of claim 11 further including a plurality of selectively activatable remote transceivers each of which is a self contained powered device that transmits the secure digital file at a pre-selected frequency to the central transceiver in real time.

13. The covert wireless data processing system of claim 11 in which the signal compression chip comprises a video codec chip.

14. The covert wireless data processing system of claim 11 in which the display means comprises a computer terminal.

15. The method of claim 1 wherein converting and packetizing the digital electric signal into the secure pre-selected IP protocol format comprises encrypting the digital signal by a video codec chip.

16. The system of claim 8 wherein the signal compression chip comprises a video codec chip.

17. The system of claim 16 wherein the video codec chip comprises an MPEG encoder/decoder.

* * * * *